United States Patent [19]

Naka

[11] Patent Number: 5,057,755
[45] Date of Patent: Oct. 15, 1991

[54] NUMERICAL CONTROL MACHINING SYSTEM

[75] Inventor: Shigeaki Naka, Aichi, Japan

[73] Assignee: Mitsubishi Denki K.K., Tokyo, Japan

[21] Appl. No.: 441,488

[22] Filed: Nov. 24, 1989

[30] Foreign Application Priority Data

Nov. 25, 1988 [JP] Japan ................................. 63-296273

[51] Int. Cl.$^5$ ...................... G05B 19/417; B25J 19/00
[52] U.S. Cl. ................................ 318/568.10; 318/562; 318/632; 364/474.11; 364/474.23
[58] Field of Search ............................... 318/560–646; 364/513, 474.11, 138, 140

[56] References Cited

U.S. PATENT DOCUMENTS

| | | | |
|---|---|---|---|
| 4,029,950 | 6/1977 | Haga | 364/474.11 X |
| 4,047,003 | 9/1977 | LaRocca et al. | 318/562 X |
| 4,069,488 | 1/1978 | Fiorenza et al. | 364/474.11 |
| 4,347,575 | 8/1982 | Gurr et al. | 307/35 X |
| 4,396,973 | 8/1983 | Imazeki et al. | 364/474.23 |
| 4,435,771 | 3/1984 | Nozawa et al. | 364/474.11 |
| 4,459,655 | 7/1984 | Willemin | 364/474.11 X |
| 4,547,854 | 10/1985 | Hashimoto et al. | 364/474.14 X |
| 4,550,375 | 10/1985 | Sato et al. | 364/474.14 X |
| 4,564,913 | 1/1986 | Yomogida et al. | 364/474.11 |
| 4,580,207 | 4/1986 | Arai et al. | 364/474.11 |
| 4,608,645 | 8/1986 | Niwa et al. | 318/632 X |
| 4,663,539 | 5/1987 | Sharp et al. | 307/38 |
| 4,747,041 | 5/1988 | Engel et al. | 307/39 |
| 4,841,431 | 6/1989 | Takagi et al. | 364/474.11 |

FOREIGN PATENT DOCUMENTS

62-44808 2/1987 Japan .

*Primary Examiner*—Paul Ip
*Attorney, Agent, or Firm*—Sughrue, Mion, Zinn Macpeak & Seas

[57] ABSTRACT

A numerical control machining system includes a group of combined NC machines. Each NC machine has a storage device for storing a respective processing program and is capable of communicating with any of the remaining NC machines. With this arrangement, a first NC machine is free to up-load a processing program owned by another NC machine and to store this processing program in the storage device of the first NC machine. The first NC machine is also free to download the processing program which it owns to another NC machine. Consequently, it is possible to share the processing programs between the NC machines in the system so that they may be directly transferred between NC machines.

12 Claims, 6 Drawing Sheets

NUMERICAL CONTROL MACHINING SYSTEM

BACKGROUND OF THE INVENTION

1. Field of the Invention

This invention relates to a numerical control machining system, and more particularly to a system which is capable of freely performing transfer of processing programs between a plurality of numerical control machines (hereinafter also called "NC machine") interconnected via a communication interface.

2. Description of the Related Art

Heretofore, numerical control machines have been practiced in a wide variety of processings. In general, these NC machines take their respective processing works independently of one another, and for this reason, processing programs are supplied to the respectively NC machines individually.

Recently, attempts have been made to provide a unified system in an effort to share many programs between a plurality of NC machines. In such conventional combined numerical control machining system, the NC machines are unified by a factory automation computer (hereinafter called "FA computer"), and many processing programs are stored in the FA computer in a centralized fashion, so that the individual processing program can be transmitted from one NC machine to another NC machine when necessary.

Figure 5:
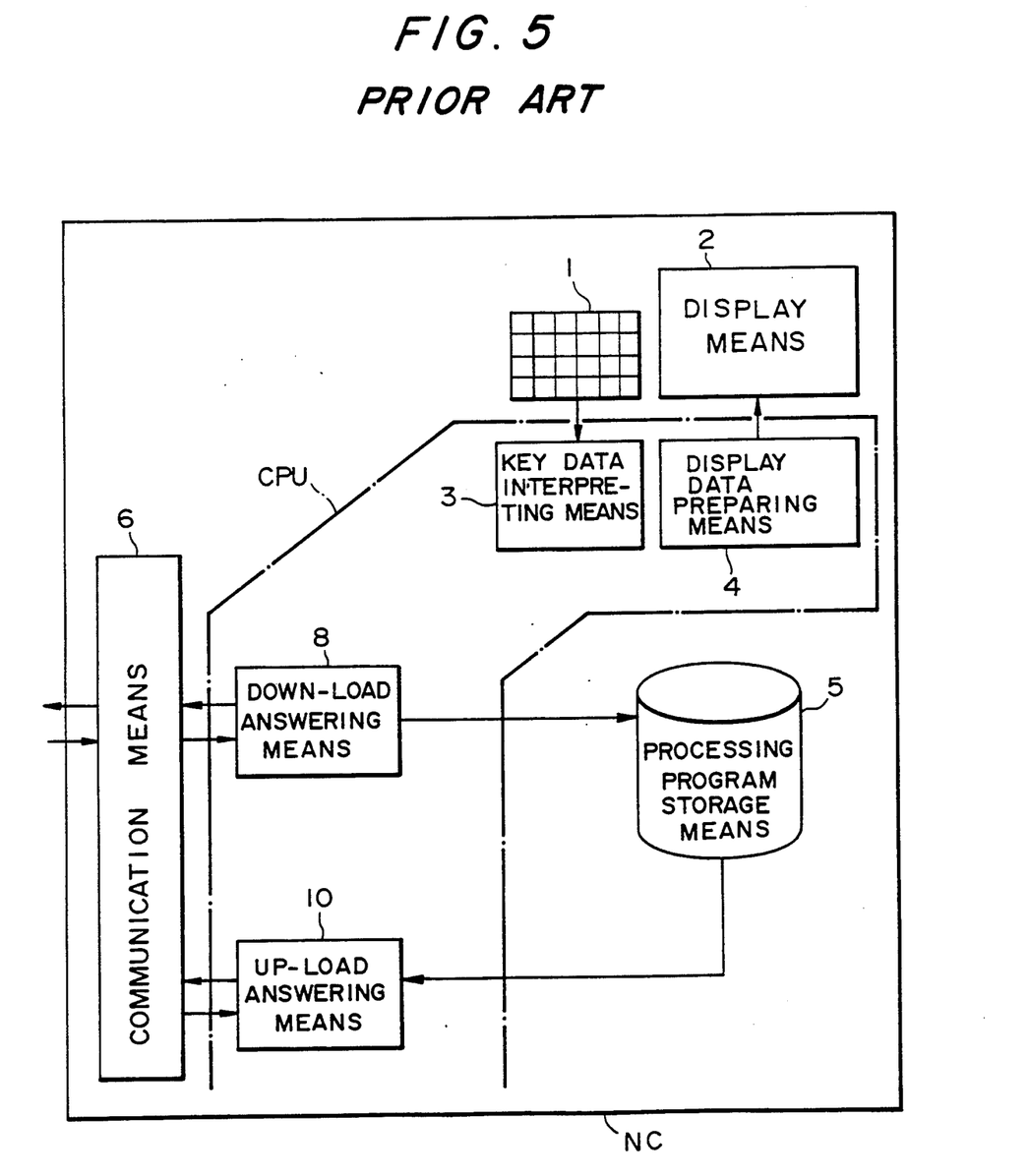
FIG. 5 is a block diagram showing a conventional NC machine.

FIG. 5 of the accompanying drawings schematically shows a typical conventional numerical control machine NC which includes a processing program storage means 5. In FIG. 5, using a key input means 1 such as in the form of a keyboard, the operator inputs key data to operate the NC machine NC. A display means 2 such as in the form of a CRT unit displays a program, the order of processing procedures, a state of diagnosis, etc. of the NC machine NC to notify the operator of them.

A key data interpreting means 3 connected to the keyboard I is included in a CPU with a control program for the NC machine NC and interprets the key data from the keyboard 1 to give a command meeting the key data. A display data preparing means 4 converts information in the NC machine NC into such data as to be displayable on the display means 2. The display data preparing means 4, like the key data interpreting means 3, is included in the CPU of the NC machine NC.

The processing program storage means 5 is in the form of an IC memory, a disk unit, a bubble memory or the like, each of which is capable of storing a plurality of processing programs. A communication interface 6 such as in the form of an RS232c port is associated with the NC machine NC for communication with external equipment.

A down-load answering means 8 gives an answer to a down-load request given from the external equipment via the communication interface 6, and as a result, the down-load answering means 8 receives a processing program transmitted from the external equipment and stores the processing program. The down-load answering means 8 also is included in the CPU.

An up-load answering means 10 gives an answer to an up-load request given from the external equipment via the communication interface 6, and as a result, the up-load answering means 10 reads a processing program from the processing program storage means 5 and transmits the processing program to the external equipment via the communication interface 6. This upload answering means 10 also is included in the CPU.

Figure 6:
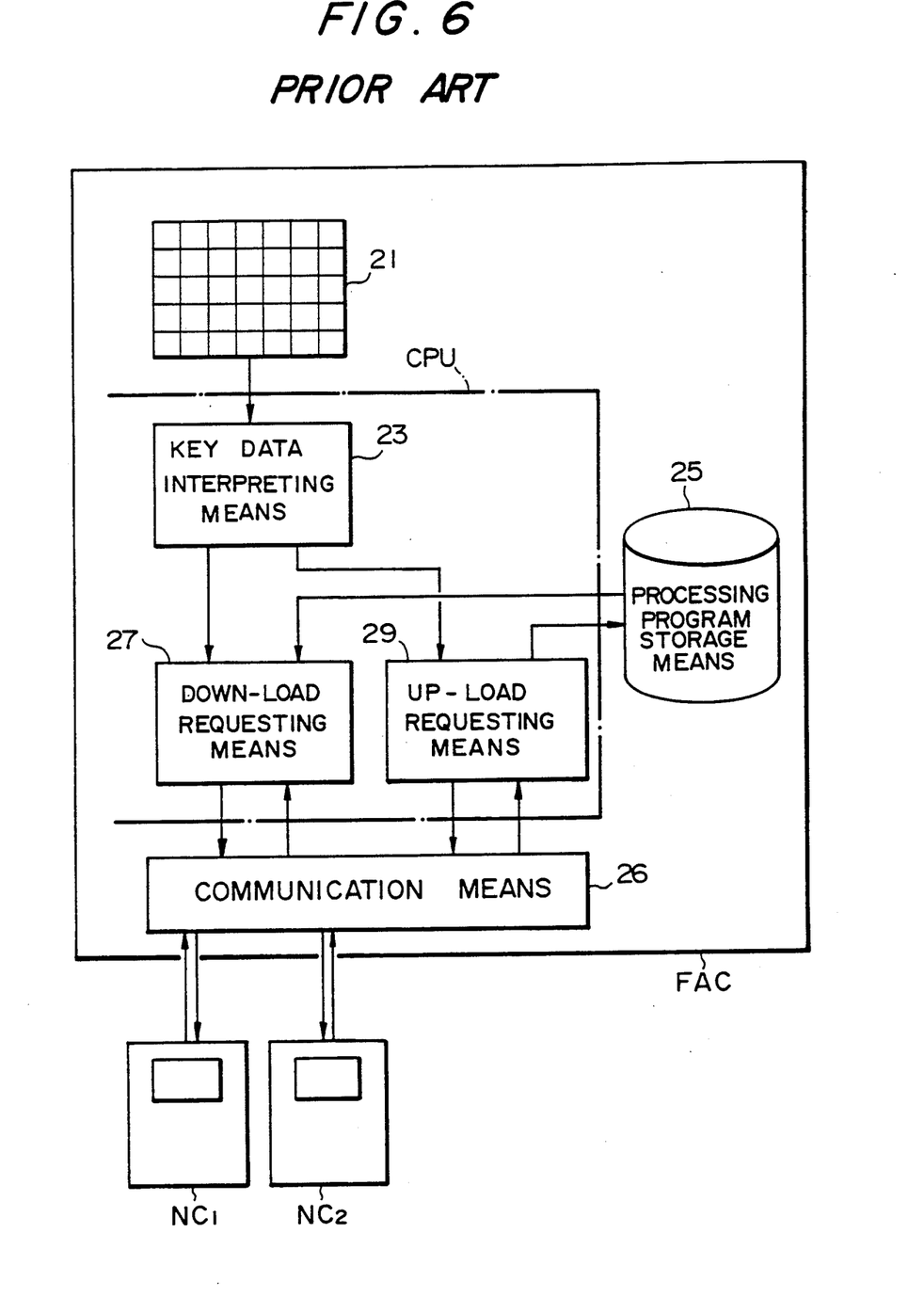
FIG. 6 is a block diagram showing the known connection between an FA computer and the NC machines.

FIG. 6 shows an example in which a plurality of conventional NC machines are combined to provide a network for transfer of processing programs between the NC machines. In FIG. 6, an FA computer FAC stores a large number of processing programs and takes a down-load or an up-load of a processing program for the individual NC machine to which the FA computer FAC is connected. The FA computer FAC, like the NC machine NC of FIG. 5, is equipped with a communication interface 26 for communication with the other NC machines $NC_1$, $NC_2$ . . . , and a processing program storage means 25 for storing processing programs. Also, a keyboard 21 and a key data interpreting means 23 are located in the FA computer FAC.

A down-load requesting means 27 issues a request to down-load a processing program with respect to the NC machine NC via the communication interface 26 and confirms an answer from the NC machine NC, whereupon the down-load requesting means 27 reads a predetermined processing program from the processing program storage means 25 to transmits the processing program to the NC machine NC via the communication interface 26. The down-load requesting means 27 is included, for example, in a CPU which is controlled by a control program is included in an FA computer FAC.

An up-load requesting means 29 issues a request to up-load a processing program with respect to the NC machine NC via the communication interface 26 and confirms an answer from the NC machine NC, whereupon the up-load requesting means 29 scoops up a predetermined processing program from the NC machine NC via the communication interface 26 to store in the processing program storage means 25. This up-load requesting means 29 also is included in the CPU of the FA computer FAC.

The operation of this conventional processing system will now be described. Heretofore, it has been a common practice to control a large number of processing programs in a centralized fashion at the FA computer FAC so that a processing program is transmitted to the NC machine NC upon necessity. Advantageous features of this system are that many processing programs can be collected at a single place and hence can be put in order without difficulty, and that each NC machine NC is only required to have a processing program storage place necessary to at most one processing.

To down-load a certain processing program to the NC machine NC, the operator operates the key input means 21 of the FA computer FAC to give a command to the down-load requesting means 27, whereupon the download requesting means 27 reads a desired processing program from the processing program storage means 25 to transmit the processing program to a predetermined NC machine NC via the communication interface 26. In response to this transmission, a down-load answering means 8 of the NC machine NC is made operative to receive the processing program via the communication interface 26 of the NC machine NC and then to store the processing program in the processing program storage means 5 of the NC machine NC.

Therefore, according to the above conventional system, the processing program storage means 5 of each NC machine NC requires only a small memory capacity. As the FA computer FAC possesses a large number of processing programs, it is possible to cause many NC machines NC, connected to this FA computer FAC, to take a variety of processing actions.

Although each NC machine NC includes a control part for reading a processing program and outputting the same program to a practical processing machine, its description is omitted here for clarity.

The unification of the processing programs by combining the NC machines and the FA computer is also known from Japanese Patent Laid-Open Publication No. 44808/1987, though there can be found something different.

In this conventional system, a group of NC processing machines are centralized at a communication node mounted in a central control unit, which must be mounted in a certain part other than the NC machines. Further, since the processing programs are stored and adminstrated in a centralized fashion so that a processing program is transmitted to the NC machines upon necessity an FA computer is necessary for the centralized control, thus causing an increased cost of production.

SUMMARY OF THE INVENTION

It is therefore an object of this invention to provide a numerical control machining system which enables transfer of processing programs freely between a plurality of NC machines combined into a network by a communication interface.

Another object of the invention is to provide a numerical control machining system in which a plurality of NC machines are combined into a single complete network so that a large number of processing programs can be shared by the NC machines without requiring an FA computer to unify all the NC machines.

According to a primary feature of this invention, there is provided a numerical control machining system which is composed of a plurality of NC machines each connected to a communication circuit, the system comprising: a processing program storage means associated with one of the NC machines (hereinafter called the first NC machine) and capable of reading and storing an optional processing program; a communication means associated with the first NC machine and connected to the remaining NC machines via the communication circuit for down-loading and up-loading a processing program between the NC machines; and a key input means associated with the first NC machine and adapted to be operated by an operator for giving a down-load or an up-load command to the communication means.

For a more specific feature of this invention, the communication means includes: a down-load requesting means associated with the first NC machine for outputting a down-load request and reading a processing program from the storage means and transmitting the read processing program to one of the remaining NC machines (hereinafter called the second NC machine) to thereby down-load to the second NC machine a processing program owned by the first NC machine; a down-load answering means associated with the first NC machine for giving an answer to the a down-load request transmitted from the second NC machine and then storing in the storage means the processing program transmitted from the second NC machine; an up-load requesting means associated with the first NC machine for outputting an up-load request to up-load a processing program owned by the second NC machine and storing in the storage means the processing program transmitted from the second NC machine; and an up-load answering means associated with the first NC machine for giving an answer to the up-load request transmitted from the second NC machine and reading the requested processing program from the storage means and transmitting the read processing program to the second NC machine.

With this arrangement, as the NC machines are connected to the communication circuit, it is possible to down-load a processing program by a down-load requesting means of a certain NC machine via a down-load answering means of another NC machine, and it is possible to up-load a processing program by an up-load requesting means of a certain NC machine via an upload answering means of another NC machine. By providing one of the NC machines with a large-capacity storage means, it is possible to achieve a similar centralized control of transfer of the processing programs without an FA computer, which is essential to the conventional system.

Further, if the storage means owned by each NC machine is enough in memory capacity if it can store its own processing program and a processing program down-loaded from another NC machine, it is possible to reduce the memories to a compact size.

Furthermore, if one or more NC machines possesses its own processing program storage means of large memory capacity and has a large quantity of processing programs in store in the storage means, a particular NC machine can perform as a substitute for the FA computer in the conventional system, thus causing a much larger quantity of shareable processing programs.

The above and other advantages, features and additional objects of this invention will be manifest to those versed in the art upon making reference to the following detailed description and the accompanying drawings in which a structural embodiment incorporating the principles of this invention is shown by way of illustrative example.

DETAILED DESCRIPTION

Figure 1:
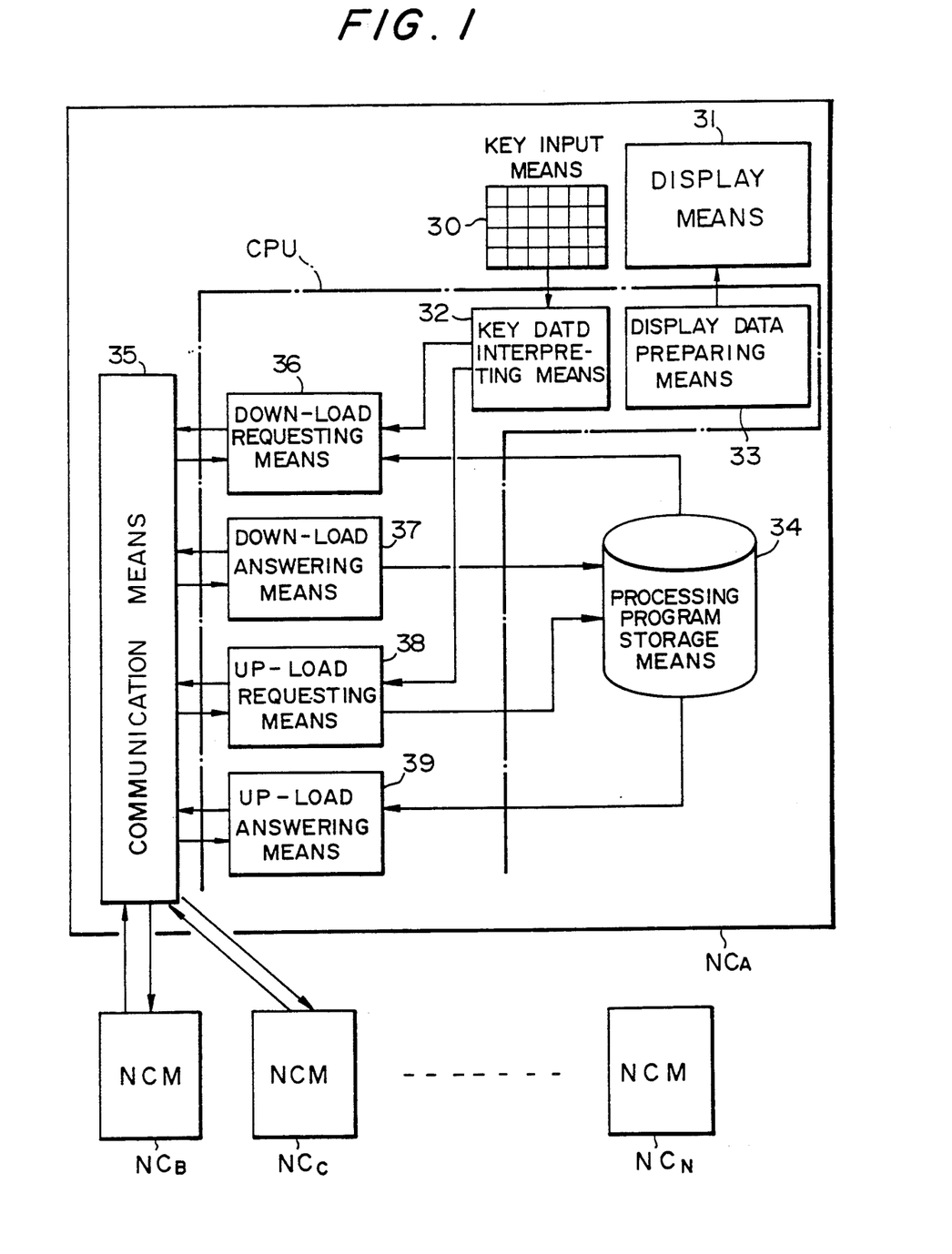
FIG. 1 is a block diagram showing a single NC machine constituting a system embodying this invention.

The principles of this invention are particularly useful when embodied in a numerical control machining system (hereinafter also called "system") such as shown in FIG. 1. The system is composed of a plurality of numerical control machines (hereinafter called "NC machines") $NC_A$, $NC_B$, $NC_C$, ... $NC_N$.

In FIG. 1, using a key input means 30 such as in the form of a keyboard, the operator inputs key data to operate the individual NC machine. A display means 31 such as in the form of a CRT unit displays a program, the order of processing procedures, a state of diagnosis, etc. of the NC machine to notify the operator of them.

A key data interpreting means 32 connected to the keyboard 30 is included in a CPU with a control program for the NC machine $NC_A$, for example, and interprets the key data from the keyboard 30 to give a command matching the key data. A display data preparing means 33 converts information in the NC machine into such data as to be displayable on the display means 31. The display data preparing means 33, like the key data interpreting means 32, is included in the CPU of the NC machine.

The processing program storage means 34 is in the form of an IC memory, a disk unit, a bubble memory or the like, each of which is capable of storing a plurality of processing programs. A communication interface 35 such as in the form of an RS232c port is associated with the NC machine NC for communication with external equipment.

If the key data issued from the key input means 30 as operated by the operator is a request for down load as a result of interpetation by the key data interpreting means 32, a down-load requesting means 36 transmits a down-load request to another NC machine $NC_B$, $NC_C$, for example, via the communication interface 35, whereupon the down-load requesting means 36 reads a processing program from the storage means 34 to down-load the processing program to a designated NC machine, e.g., the NC machine $NC_B$ via the communication interface 35. This down-load requesting means 36 also is included in the CPU with a control program which CPU is associated with the NC machine $NC_A$, for example.

A down-load answering means 37 gives an answer to a down-load request given from external equipment via the communication interface 35, and as a result, the down-load answering means 37 receives a processing program transmitted from the external equipment and stores the processing program in the storage means 34. The down-load answering means 37 also is included in the CPU.

Consequently, according to this invention, each and every NC machine can down-load its own processing program with respect to an optional one other NC machine, and also can accept a processing program down-loaded from another NC machine.

If the key data issued from the key input means 30 as operated by the operator is a request for upload as a result of interpetation by the key data interpreting means 32, an up-load requesting means 38 transmits an up-load request to another NC machine $NC_B$, $NC_C$, for example, via the communication interface 35, whereupon the up-load requesting means 38 receives a processing program transmitted from a designated NC machine e.g., the NC machine $NC_B$ via the communication interface 35 and stores the processing program in storage means. This up-load requesting means 38 also is included in the CPU with a control program which CPU is associated with the NC machine $NC_A$.

An up-load answering means 39 gives an answer to an up-load request given from the external equipment via the communication interface 35, and as a result, the up-load answering means 39 reads a processing program from the processing program storage means 34 and transmits the processing program to the external equipment via the communication interface 35. This up-load answering means 39 also is included in the CPU.

Therefore, according to this invention, each and every NC machine any time can up-load a processing program owned by an optional one of the remaining NC machines to scoop up the processing program, and reversely can give its own processing program to an optional one of the remaining NC machines in response to an up-load request from such another NC machine.

The storage means 34 associated with the NC machine $NC_A$ has a memory capacity enough to store all of the processing programs to be used by the NC machines $NC_A$ through $NC_N$ interconnected in the manner shown in FIG. 1. And this NC machine $NC_A$ manages these processing programs in a centralized fashion and performs the same functions as the conventional FA computer FAC of FIG. 6. Therefore, every remaining NC machine $NC_B$ through $NC_N$ connected with the NC machine $NC_A$ is equipped with a storage means having such a capacity as to store only a program necessary to a single process for enough, which is economical. Thus the NC machine $NC_B$–$NC_N$ are identical in construction with the NC machine $NC_A$ and are different therefrom only in that their own storage means have a memory capacity smaller than that of the storage means 34 owned by the NC machine $NC_A$.

Figure 2:
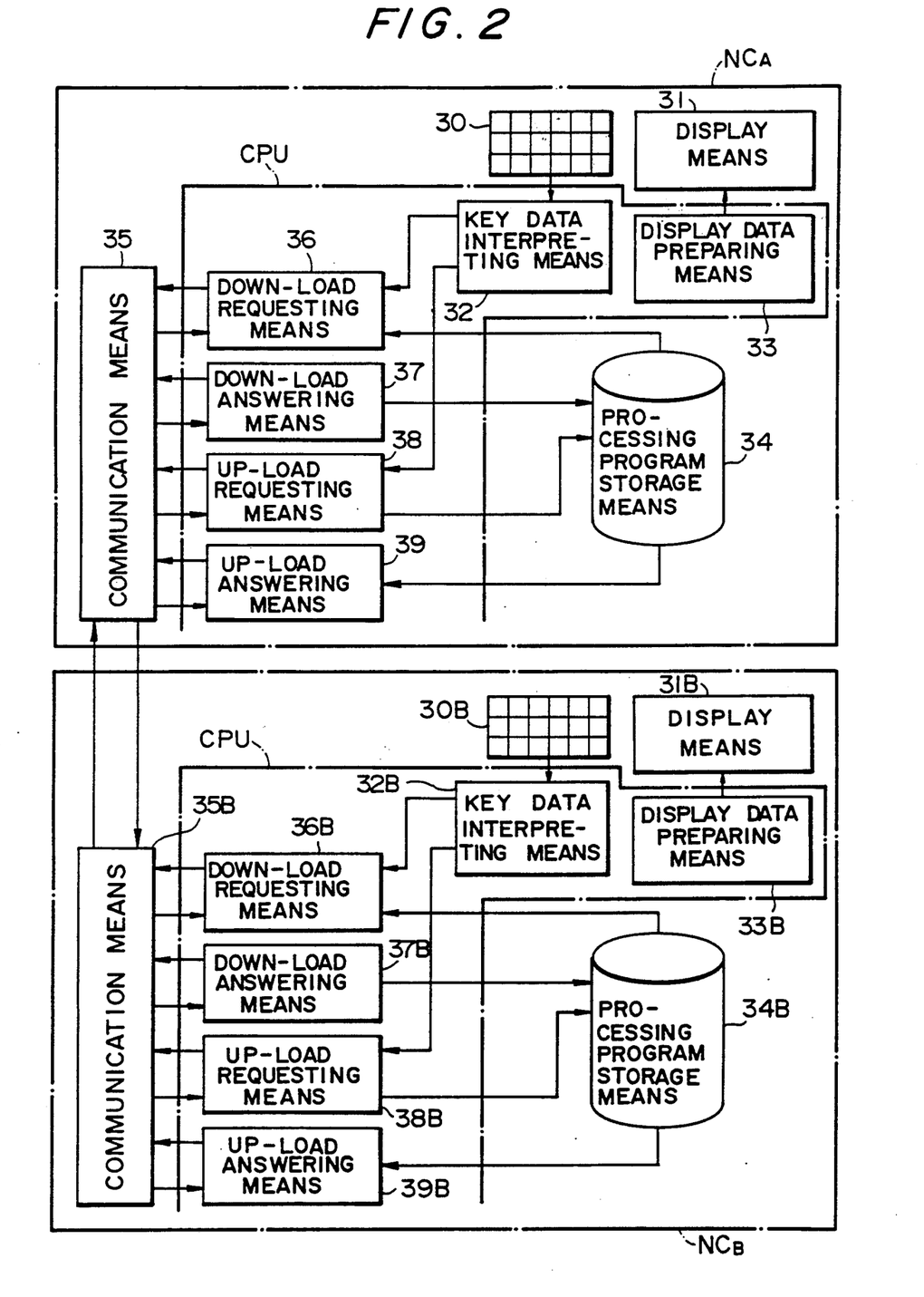
FIG. 2 is a block diagram showing the connection between two NC machines jointly constituting a system of this invention.

FIG. 2 shows the manner in which one NC machine (hereinafter called "first NC machine") $NC_A$ and another NC machine (hereinafter called "second NC machine") $NC_B$ are linked. In the NC machine $NC_B$, parts corresponding to those of the NC machine $NC_A$ are designated by like reference numerals each suffixed with B. Their description is omitted here for clarity.

The transfer of a processing program between the first and second NC machines $NC_A$, $NC_B$ will now be described with reference to the flowcharts of FIGS. 3 and 4.

Firstly, necessary processing programs for the group of NC machines $NC_A$ through $NC_N$ have been stored in their respective own storage means in advance, or if necessary, by a known method such as a paper tape reader (not shown), a communication circuit (not shown) leading to a host computer, etc.

Figure 3:
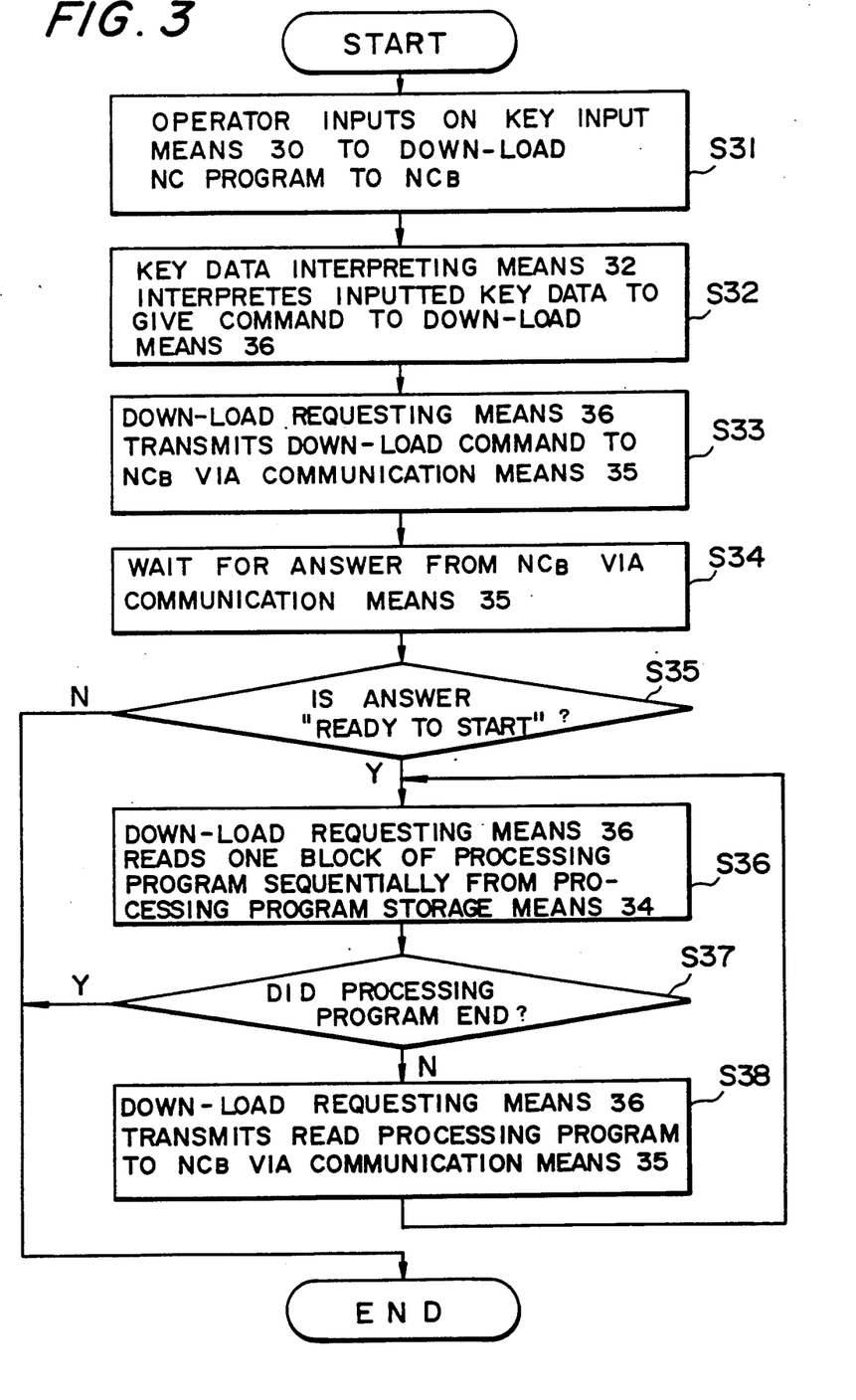
FIGS. 3 and 4 are flowcharts showing the operation of the system of FIG. 2.
Figure 4:
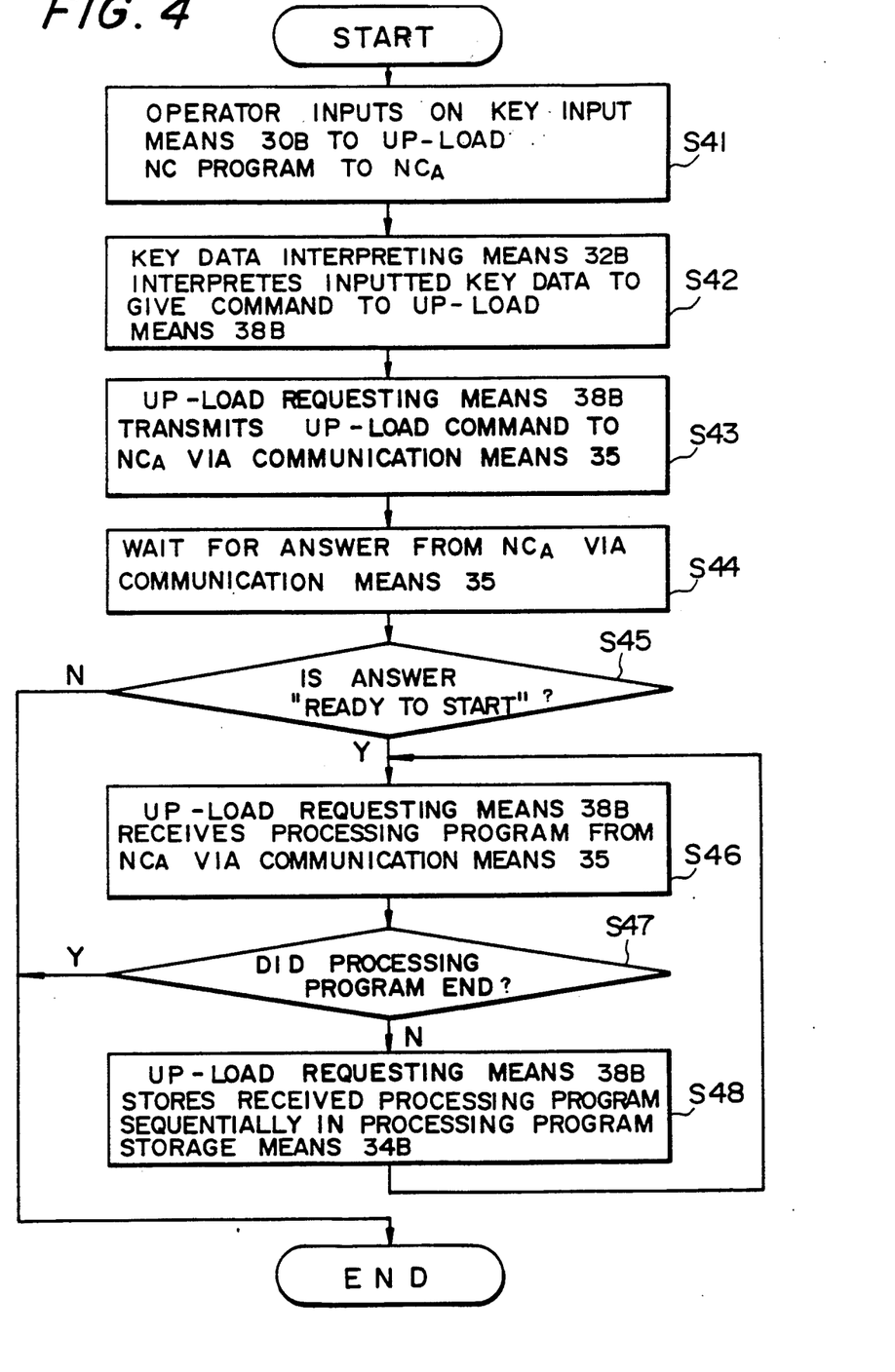

Secondly, when down-loading a processing program from the first NC machine $NC_A$ to the second NC machine $NC_B$, the operator operates the key input means 30 of the first NC machine $NC_A$ to input key data such as to down-load the processing program to the second NC machine $NC_B$ (S31), as shown in FIG. 3. Then the key data are interpreted by the key data interpreting means 32 to give a command to the down-load requesting means 36 (S32). Upon receipt of this command, the down-load requesting means 36 transmits to the second NC machine $NC_B$ via the communication interface 35 a request to initiate the down-loading (S33). The down-load requesting means 36 waits for an answer from the second NC machine $NC_B$ via the communication interface 35 (S34).

Meanwhile, upon receipt of the down-load request from the first NC machine $NC_A$, the down-load answering means 37B of the second NC machine $NC_B$ transmits to the first NC machine $NC_A$ via the communication interface 35B, depending on the current state of operation of the second NC machine $NC_B$, an answer indicating that the second NC machine $NC_B$ is ready to start, for example.

If the contents of the answer, upon receipt of the answer from the second NC machine $NC_B$ by the communication interface 35, indicates that the second NC machine $NC_B$ is ready to start (S35), the down-load requesting means 36 of the first NC machine $NC_A$ reads from the storage means 34 processing programs sequentially one block after another (S36). Then the download requesting means 36 transmits the read-out processing programs successively to the second NC machine via the communication interface 35 until all the processing programs are read out (S38).

In the meantime, as the processing programs are transmitted to it via the communication means 35B, the down-load answering means 37B of the NC machine $NC_B$ stores the processing programs successively in the storage means 34B.

Thus the first NC machine $NC_A$ transmits the processing programs one block after another, and stops this transmitting when all the processing programs have been transmitted (S37).

The up-loading of the processing programs from the first NC machine $NC_A$ to the second NC machine $NC_B$ in response to an up-load request at the key input means 30B of second NC machine $NC_B$ will now be described with reference to the flowchart of FIG. 4.

For instance, the operator operating the second NC machine $NC_B$ operates the key input means 30B of the second NC machine $NC_B$ to input key data to up-load the processing program (S41). The key data is interpreted by the key data interpreting means 32B of the second NC machine $NC_B$ so that a command is given to the up-load requesting means 38B of the second NC machine $NC_B$ (S42). Then the up-load requesting means 38B transmits to the first NC machine $NC_A$ via the communication interface 35B a command to start the uploading (S43). And the up-load requesting means 38B waits for an answer transmitted from the first NC machine $NC_A$ via the communication interface 35B (S44).

Meanwhile, if the command for up-load request is given from the second NC machine $NC_B$ and if the first NC machine $NC_A$ is ready to start, the up-load answering means 39 of the first NC machine $NC_A$ transmits such information to the second NC machine $NC_B$ and then reads the processing programs one block after another from the storage means 34 to transmit the read-out processing programs successively to the second NC machine $NC_B$ via the communication interface 35.

Upon receipt of the information that the first NC machine $NC_A$ is ready to start (S45), the up-load requesting means 38B of the second NC machine $NC_B$ receives the processing programs successively transmitted from the first NC machine $NC_A$ via the communication interface 35B (S46).

Until after all the processing programs have been transmitted completely (S47), the up-load requesting means 38B stores the received processing programs one after another in the storage means 34B. When all the processing programs have been received and stored in the storage means 34B (S47), the up-load requesting means 38B completes the storing. Thus the operator has obtained desired processing programs and then can start the processing.

According to the system of this invention, since a command to down-load or up-load a processing program is issued from each NC machine of a group of NC machines to any one of the remaining NC machines, it is possible to realize the free transfer of processing programs between the NC machines linked together to provide a unified network.

What is claimed is:

1. A numerical control (NC) machining system including a plurality of NC machines each connected to a communication circuit, a first of said NC machines comprising:

(a) a processing program storage means for reading and storing an optional processing program;

(b) a communication means connected to the remaining NC machines via the communication circuit for down-loading and up-loading a processing program between the NC machines, said communication means including a down-load requesting means for outputting a down-load request, and for reading and transmitting a processing program from said storage means to a second of the NC machines;

a down-load answering means for answering a down-load request transmitted from the second NC machine and then storing in said storage means a processing program transmitted from the second NC machine; wherein said second NC machine includes key input means for allowing an user to initiate the down-load request from said second NC machine;

(c) a key input means to be operated by an operator for giving a down-load or an up-load command to said communication means.

2. A numerical control machining system according to claim 1, wherein said communication means includes:

an up-load requesting means associated with the first NC machine for outputting an up-load request to up-load a processing program owned by the second NC machine and storing in said storage means the processing program transmitted from the second NC machine; and an up-load answering means associated with the first NC machine for giving an answer to an up-load request transmitted from the second NC machine and reading the requested processing program from said storage means and transmitting the read processing program to the second NC machine.

3. A numerical control machining system according to claim 1, wherein said storage means has a capacity of storing therein at least one processing program.

4. A numerical control machining system according to claim 2, wherein said storage means has a capacity of storing therein at least one processing program.

5. A numerical control machining system according to claim 1, wherein at least one of the NC machines includes a processing program storage means capable of storing therein a plurality of processing programs.

6. A numerical control machining system according to claim 2, wherein at least one of the NC machines includes a processing program storage means capable of storing therein a plurality of processing programs.

7. A numerical control (NC) machining system comprising a plurality of NC machines each connected to a communication circuit, a first of said NC machines comprising:

means for storing at least one processing program;

means for down-loading a processing program from said storing means to any other of said plurality of NC machines via said communication circuit;

means for up-loading a processing program from any other of said plurality of NC machines to said storing means via said communication circuit input means for allowing an operator to provide an up-load command to said up-loading means or a down-load command to said down-loading means;

an up-load answering means for answering an up-load request transmitted from any other of said NC machines, via said communication circuit;

wherein each of said NC machines comprises a storing means, a down-loading means, an up-loading means, and input means substantially the same as said storing means, down-loading means, up-loading means and input means of said first NC machine, respectively, each of said input means allowing a user to initiate an up-load request from a correspond said NC machines.

8. A numerical control machining system according to claim 7, wherein each of said NC machines comprises a storing means, a down-loading means, and an up-loading means substantially the same as said storing means, down-loading means, and up-loading means of said first NC machine, respectively.

9. A numerical control machining system according to claim 7, wherein said storing means of each of said NC machines has a capacity for storing a processing program owned by their respective NC machine and a processing program owned by another of said plurality of NC machines.

10. A numerical control machining system according to claim 7, wherein said first NC machine has a larger storage capacity than each of said other NC machines.

11. A numerical control machining system according to claim 7, said down-loading means comprising:
a down-load requesting means responsive to said input means for providing a down-load request, reading a processing program from said storing means, and transmitting the read processing program to any other of said NC machines via said communication circuit; and
said up-load answering means for giving an answer to an up-load request transmitted from any other of said NC machines, reading the requested processing program from said storing means, and transmitting the read processing program to said other NC machine;
and said up-loading means comprising:
an up-load requesting means responsive to said input means for providing an up-load request to up-load a processing program owned by any other of said NC machines, receiving the requested processing program transmitted from said other NC machine via said communication circuit, and storing said received processing program in said storing means; and
a down-load answering means for giving an answer to a down-load request transmitted from any other of said NC machines to down-load a processing program owned by said other NC machine, receiving said processing program from said other NC machine via said communication circuit, and storing said received processing program in said storing means.

12. A numerical control machining system according to claim 11, wherein each of said NC machines comprises a storing means, a down-loading means, an up-loading means, an input means, a down-load requesting means, an up-load answering means, an up-load requesting means, and a down-load answering means substantially the same as that of said first NC machine.

* * * * *